US012420264B1

United States Patent
Omran et al.

(10) Patent No.: US 12,420,264 B1
(45) Date of Patent: Sep. 23, 2025

(54) NANOCOMPOSITE MATERIAL

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/225,576

(22) Filed: Jun. 2, 2025

(51) Int. Cl.
| | |
|---|---|
| B01J 21/06 | (2006.01) |
| B01J 21/18 | (2006.01) |
| B01J 23/02 | (2006.01) |
| B01J 35/45 | (2024.01) |
| B01J 35/51 | (2024.01) |
| B01J 35/61 | (2024.01) |
| B01J 35/63 | (2024.01) |
| B01J 35/64 | (2024.01) |

(Continued)

(52) U.S. Cl.
CPC ............ B01J 21/066 (2013.01); B01J 21/18 (2013.01); B01J 23/02 (2013.01); B01J 35/45 (2024.01); B01J 35/51 (2024.01); B01J 35/613 (2024.01); B01J 35/633 (2024.01); B01J 35/647 (2024.01); B01J 35/695 (2024.01); B01J 37/009 (2013.01); B01J 37/04 (2013.01); B01J 37/06 (2013.01); B01J 37/084 (2013.01); B01J 37/088 (2013.01); B01J 37/346 (2013.01)

(58) Field of Classification Search
CPC ............. C01B 21/0605; C01B 21/0828; B01J 21/066; B01J 35/45; B01J 35/51; B01J 35/647; B01J 35/613; B01J 35/695; B01J 35/633; B01J 21/18; B01J 23/02; B01J 37/009; B01J 37/04; B01J 37/06; B01J 37/084; B01J 37/088; B01J 37/346; B01J 23/002
USPC ..................... 502/5, 349, 250, 525
See application file for complete search history.

(56) References Cited

FOREIGN PATENT DOCUMENTS

| CN | 108654673 A | * 10/2018 | ............. B01J 27/24 |
|---|---|---|---|
| CN | 107840658 B | 7/2020 | |

(Continued)

OTHER PUBLICATIONS

O. Aldaghri et al., "CaO@ZrO2@g-C3N4 nanosorbent for superior malachite green dye selectivity and adsorption from contaminated water." Diamond & Related Materials 144, pp. 1-12. (Year: 2024).*

(Continued)

*Primary Examiner* — Patricia L. Hailey
(74) *Attorney, Agent, or Firm* — Oblon, McClelland, Maier &Neustadt, L.L.P.

(57) ABSTRACT

A $ZrO_2/CaSiO_3/g\text{-}C_3N_4$ nanocomposite material includes spherical metal oxide nanoparticles which include a $ZrO_2$ phase and a $CaSiO_3$ phase dispersed on a matrix of $g\text{-}C_3N_4$ nanosheets. The spherical metal oxide nanoparticles have an average particle diameter in a range from 3 to 18 nanometers (nm). The $ZrO_2/CaSiO_3/g\text{-}C_3N_4$ nanocomposite material has a Brunauer-Emmett-Teller (BET) surface area greater than or equal to 55 square meters per gram ($m^2 \cdot g^{-1}$).

20 Claims, 6 Drawing Sheets

(51) Int. Cl.
  *B01J 35/66* (2024.01)
  *B01J 37/00* (2006.01)
  *B01J 37/04* (2006.01)
  *B01J 37/06* (2006.01)
  *B01J 37/08* (2006.01)
  *B01J 37/34* (2006.01)

(56) References Cited

FOREIGN PATENT DOCUMENTS

| CN | 111663136 A | | 9/2020 | |
|---|---|---|---|---|
| CN | 116408118 A | | 7/2023 | |
| CN | 118831632 A | * | 10/2024 | ............. B01D 53/94 |

OTHER PUBLICATIONS

A. Modwi et al., "High Malachite Green dye removal by ZrO2-g-C3N4 (ZOCN) meso-sorbent: Characteristics and adsorption mechanism." Diamond & Related Materials 132, pp. 1-10. (Year: 2023).*

Lihua Long et al., "Preparation and properties of β-CaSiO3/ZrO2 (3Y) nanocomposites." Journal of the European Ceramic Society 28, pp. 2883-2887. (Year: 2008).*

Moutaz Aldrdery et al., "Preparation and physicochemical characterization of highly efficient ZrO2/g-C3N4 composite catalysts for visible-light-driven removal of tetracycline antibiotics." Diamond & Related Materials 151, pp. 1-14. (Year: 2025).*

A. A. Okeyanmi et al., "Fabrication and characterization of porous ceramic composite membrane for water and wastewater treatment." Desalination and Water Treatment 246, pp. 174-195. (Year: 2022).*

Jayanta Bauri, et al., "Thermal and electronic states of exfoliated gC3N4-based nanocomposite with ZrO2 nanoparticles as a robust emissive layer ", Materials Science in Semiconductor Processing, vol. 154, Feb. 2023, 107205 (Partial Article) (5 pgs.).

Chaoliang Wang, et al., "Ca-doped g-C3N4 was prepared by two-step calcination for efficient photodegradation of methylene blue", Desalination and Water Treatment, vol. 320, Oct. 2024, 100634 (8 pgs.).

* cited by examiner

NANOCOMPOSITE MATERIAL

BACKGROUND

Technical Field

The present disclosure is directed to a nanocomposite material, more particularly, the nanocomposite material including $ZrO_2$, $CaSiO_3$, and g-$C_3N_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Carbon-based nanomaterials offer several advantages, including a high surface area for enhanced electrochemical applications, electrical conductivity for efficient charge transfer, and chemical stability [See: Ibrahim, T. G., et al., Eliminating Manifold Pharmaceutical Pollutants with Carbon Nanoparticles Driven via a Short-Duration Ball-Milling Process, Surfaces, 7, 3, 493-507]. Carbon-based nanomaterials are cost-effective and environmentally friendly. The performance of carbon-based materials in supercapacitors is improved by combining with materials like metal films or graphene [See: Khairy, M., et al., Enhancing the Conductivity and Dielectric Characteristics of Bismuth Oxyiodide via Activated Carbon Doping, Molecules, 29, 9, 2082]. The graphitic carbon nitride (g-$C_3N_4$) has enhanced properties as compared to activated carbon, including the ability to store charge using solar energy and broader light absorption due to its lower bandgap. The structural tunability of g-$C_3N_4$ through carbon-defect and two-dimensional engineering further enhances its performance. The modifications enhance porosity and surface area, making g-$C_3N_4$ a promising material for supercapacitors.

Several studies have demonstrated that the morphology of g-$C_3N_4$ nanostructures plays a role in determining the photocatalytic efficiency [See: Zhang, Y. W., et al., Porous graphitic carbon nitride synthesized via direct polymerization of urea for efficient sunlight-driven photocatalytic hydrogen production, Nanoscale, 2012, 4, 5300-5303]. Exfoliating bulk g-$C_3N_4$ into nanosheets through thermal oxidative etching has been found to enhance its photocatalytic performance [See: Niu, P., et al., Graphene-like carbon nitride nanosheets for improved photocatalytic activities, Adv. Func. Mat., Volume 22, Issue 22, 2012, pages 4763-4770; and Ren, J., et al., Thermal oxidative etching method derived graphitic $C_3N_4$: Highly efficient metal-free catalyst in the selective epoxidation of styrene, RSC Adv., 2017, 7, 5340-5348]. The duration of thermal oxidative etching strongly influences the surface chemistry and microstructure of g-$C_3N_4$ [See: Su, Q., et al., Urea-derived graphitic carbon nitride as an efficient heterogeneous atalyst for $CO_2$ conversion into cyclic carbonates, Catal. Sci. Technol., 2014, 4, 1556-1562]. Moreover, the photocatalytic activity of g-$C_3N_4$ varies depending on the precursor used for its synthesis [See: Dong, H., et al., Synthesis of g-$C_3N_4$ by different precursors under burning explosion effect and its photocatalytic degradation for tylosin, Applied Catalysis B: Environmental, Volume 230, 2018, pages 65-76]. Therefore, selecting an appropriate precursor optimizes g-$C_3N_4$ photocatalytic properties. Typically, bulk g-$C_3N_4$ is synthesized using urea, melamine, dicyandiamide, or melamine as precursors. Composite materials, formed by combining distinct components, exhibit improved properties due to the interaction of distinct components.

The integration of multifunctional nanocomposites revolutionized industrial and environmental applications due to enhanced physicochemical properties. Nanocomposites included at least two phases, with a reinforcing phase embedded within a matrix phase of metal, ceramic, or polymer elements, exhibiting enhanced functionality and multifunctional properties compared to single-component counterparts. Furthermore, the integration of multiple functional phases into a single nanocomposite structure generated synergistic effects that enhanced overall performance, resulting in enhanced surface area, adsorption capacity, and ion-exchange capabilities. Despite these advantages, phase instability, limited compositional uniformity, and high production costs restricted widespread adoption. Therefore, addressing these challenges requires advanced fabrication techniques and innovative material design strategies.

Presently, research has shifted toward the exploration of various nanostructures, particularly those based on metal oxides, carbonates, and hydroxides. These nanostructures exhibit tailored properties that enhance their applicability in fields such as catalysis, environmental remediation, and electrochemical energy storage. Research efforts have emphasized the synthesis of materials with high reactivity, stability, and functional adaptability. However, conventional synthesis techniques present challenges such as inconsistent particle size distribution, poor morphological control, and limited compositional uniformity. Single-phase and binary nanomaterials often lack the multifunctionality required for high-performance applications. Additionally, high production costs, complex synthesis procedures, and energy-intensive processing hinder scalability. Addressing these challenges requires optimizing synthesis parameters, improving phase distribution control, and integrating hybrid fabrication approaches.

Accordingly, it is one object of the present disclosure to provide a nanocomposite material that may circumvent the above-listed drawbacks and limitations of the materials known in the art.

SUMMARY

In an exemplary embodiment, a $ZrO_2$/$CaSiO_3$/g-$C_3N_4$ nanocomposite material includes spherical metal oxide nanoparticles comprising a $ZrO_2$ phase and a $CaSiO_3$ phase dispersed on a matrix of g-$C_3N_4$ nanosheets. The spherical metal oxide nanoparticles have an average particle diameter in a range from 3 to 18 nanometers (nm). The $ZrO_2$/$CaSiO_3$/g-$C_3N_4$ nanocomposite material has a Brunauer-Emmett-Teller (BET) surface area greater than or equal to 55 square meters per gram ($m^2 \cdot g^{-1}$).

In some embodiments, the $ZrO_2$/$CaSiO_3$/g-$C_3N_4$ nanocomposite material has a BET surface area greater than or equal to 60 $m^2 \cdot g^{-1}$.

In some embodiments, the $ZrO_2$/$CaSiO_3$/g-$C_3N_4$ nanocomposite material has a BET surface area greater than or equal to 65 $m^2 \cdot g^{-1}$.

In some embodiments, the $ZrO_2$/$CaSiO_3$/g-$C_3N_4$ nanocomposite material has a pore volume greater than or equal to 0.15 cubic centimeters per gram ($cm^3 \cdot g^{-1}$).

In some embodiments, the $ZrO_2$/$CaSiO_3$/g-$C_3N_4$ nanocomposite material has a pore volume greater than or equal to 0.20 $cm^3 \cdot g^{-1}$.

In some embodiments, the $ZrO_2/CaSiO_3/g$-$C_3N_4$ nanocomposite material has a pore volume greater than or equal to 0.25 $cm^3 \cdot g^{-1}$.

In some embodiments, the $ZrO_2/CaSiO_3/g$-$C_3N_4$ nanocomposite material has a trimodal pore size distribution with average pore diameters maximized at 6.2 nm, 9.53 nm, and 17.2 nm.

In some embodiments, the spherical metal oxide nanoparticles have an average particle diameter in a range from 5 to 12 nm.

In some embodiments, the spherical metal oxide nanoparticles have an average particle diameter of 8.5 nm.

In another exemplary embodiment, a method for making the $ZrO_2/CaSiO_3/g$-$C_3N_4$ nanocomposite material is described. The method includes autoclaving a solution comprising calcium nitrate, sodium metasilicate, and ethanol at a temperature from 150 to 210° C. for 1 to 3 hours to form a first reaction mixture. The method includes dispersing the first reaction mixture in distilled water, filtering, and rinsing with distilled water to form $CaSiO_3$. The method further includes drying the $CaSiO_3$ at 100 to 140° C. for 1 to 2 hours to form dried $CaSiO_3$. The method further includes heating urea in a crucible at a temperature from 500 to 700° C. for 0.5 to 2 hours to form g-$C_3N_4$. The method further includes heating a reactive solution comprising zirconium oxychloride octahydrate, xylose, and nitric acid at 180 to 220° C. for 2 to 4 hours to form a zirconium intermediate. The method further includes calcining the zirconium intermediate at a 500 to 600° C. for 3 to 5 hours to form $ZrO_2$. The method further includes dispersing the dried $CaSiO_3$, g-$C_3N_4$, and $ZrO_2$ in ethylene glycol monomethyl ether to form a second reaction mixture. The method further includes microwaving the second reaction mixture at 160 to 200° C. and 4 to 6 bar pressure for 0.5 to 2 hours to form a first intermediate. The method further includes dispersing the first intermediate in distilled water, filtering, rinsing with distilled water, and drying at 120 to 180° C. for 3 to 5 hours to form the $ZrO_2/CaSiO_3/g$-$C_3N_4$ nanocomposite material.

In some embodiments, the concentration of calcium nitrate in the first reaction mixture is in a range from 0.1 to 10 g/L.

In some embodiments, the concentration of sodium metasilicate in the first reaction mixture is in a range from 0.1 to 10 g/L.

In some embodiments, the concentration of ethanol in the first reaction mixture is in a range from 500 milliliters to liters (ml/L).

In some embodiments, the urea is heated in the crucible at a temperature of 600° C. for 45 minutes.

In some embodiments, the concentration of zirconium oxychloride octahydrate in the reactive solution mixture is in a range from 100 grams per litre (g/L).

In some embodiments, the concentration of xylose in the reactive solution mixture is in a range from 100 g/L.

In some embodiments, the concentration of nitric acid in the reactive solution mixture is in a range from 90 ml/L.

In some embodiments, the zirconium intermediate is calcined at 550° C. for 4 hours to form $ZrO_2$.

In some embodiments, the second reaction mixture is microwaved at 180° C. and 5 bar pressure.

In some embodiments, the second reaction mixture is microwaved for 1 hour.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
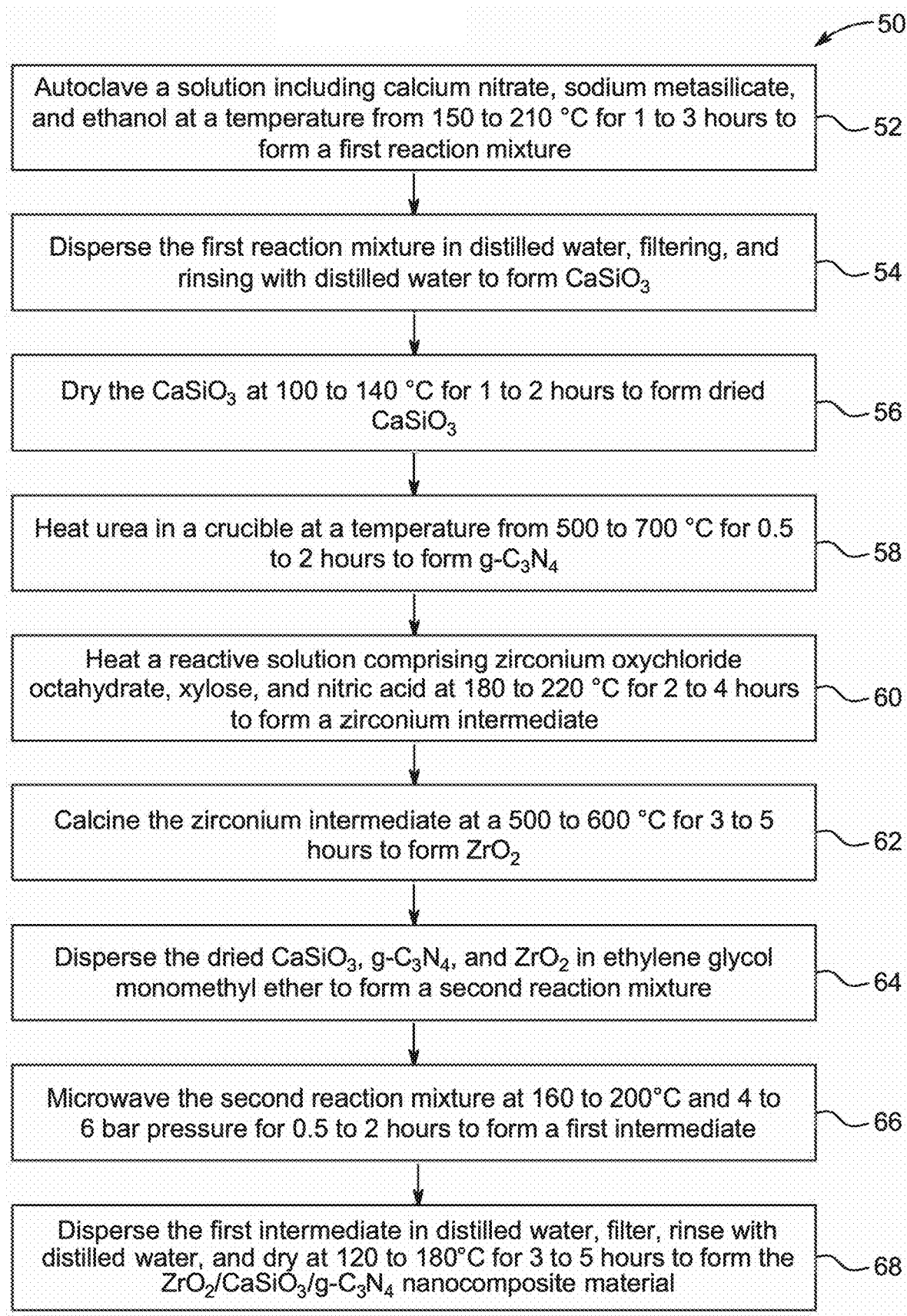
FIG. 1 is an exemplary flowchart of a method for preparing a $ZrO_2/CaSiO_3/g$-$C_3N_4$ nanocomposite material (nanocomposite material), according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees celsius (° C.)±3° C. in the present disclosure.

As used herein, the term 'nanoparticles (NPs)' refers to particles having a particle size of 1 nanometer (nm) to 1000 nm within the scope of the present disclosure.

As used herein, the term 'nanocomposite' refers to a composite material that has at least one component with a grain size measured in nanometers.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a parameter in characterizing the porous structure of materials, such as adsorbents or catalysts.

As used herein, the term 'trimodal' refers to a material's pore structure where there are three distinct peaks in the distribution of pore sizes, meaning there are three separate populations of different sized pores within the material. These populations are typically categorized into micropores, mesopores, and macropores, with clear gaps between them. In other words, a pore size distribution with three distinct modes or maxima on a graph representing the data.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a $ZrO_2/CaSiO_3/g-C_3N_4$ nanocomposite designed to function as a high-performance nanocomposite material with potential applications in areas such as photocatalysis and supercapacitors. The present disclosure circumvents the drawbacks of prior art by addressing limitations such as high catalyst costs, slow reaction rates, and environmental concerns. Traditional activated carbon in nanocomposites often suffer from low stability, poor conductivity, and limited electrochemical performance, reducing their overall efficiency. In contrast, the present disclosure uses a cost-effective catalyst that has better photoactivity, a wider spectrum of light absorption, and improved structural qualities than activated carbon. Also, $g-C_3N_4$ may store charge using solar energy making it a sustainable and renewable energy source. The simplicity of its preparation and its high catalytic activity also provide scalability and practical applicability, without needing to apply potential or use electrodes, making it a more efficient and sustainable alternative to existing methods.

A nanocomposite material (also referred to as a nanocomposite) is described. The nanocomposite includes spherical metal oxide nanoparticles, which include a $ZrO_2$ phase and a $CaSiO_3$ phase, dispersed on a matrix of $g-C_3N_4$ nanosheets. The spherical metal oxide nanoparticles have an average particle diameter in a range from 2 to 14 nm, preferably 6 to 10 nm, preferably 8 to 12 nm, preferably 9 to 16 nm, and more preferably 10 to 17 nm. In a preferred embodiment, the spherical metal oxide nanoparticles have an average particle diameter in a range from 3 to 18 nm. In another preferred embodiment, the spherical metal oxide nanoparticles have an average particle diameter in a range from 5 to 12 nm. In yet another preferred embodiment, the spherical metal oxide nanoparticles have an average particle diameter of 8.5 nm.

In some embodiments, the nanocomposite is porous. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), imaging techniques such as scanning electron microscopy (SEM) and transmission electron microscopy (TEM).

The Brunauer-Emmett-Teller (BET) specific surface area of the nanocomposite is greater than or equal to 25 square meters per gram ($m^2/g$), preferably 30 $m^2/g$, preferably 35 $m^2/g$, preferably 40 $m^2/g$, preferably 45 $m^2/g$, preferably 50 $m^2/g$. In a preferred embodiment, the nanocomposite has a BET surface area greater than or equal to 55 $m^2/g$. In another preferred embodiment, the nanocomposite material has a BET surface area greater than or equal to 60 $m^2/g$. In yet another preferred embodiment, the nanocomposite material has a BET surface area greater than or equal to 65 $m^2/g$. Still further, another preferred embodiment, the nanocomposite material has a BET surface area greater than or equal to 66.5 $m^2/g$. The BET hypothesis is the foundation for an analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. The marked high specific surface area reflects the good dispersion of these metal oxides nanoparticles on $g-C_3N_4$. In some embodiments, pore diameter, pore volume, and BET surface area are measured by gas adsorption analysis, preferably $N_2$ adsorption analysis (e.g., $N_2$ adsorption isotherms).

In some embodiments, an average pore diameter of the first mode of the nanocomposite, according to Barrett-Joyner-Halenda (BJH) measurement method, is in a range from 2 to 10 nm, preferably 4 to 8 nm, preferably 5 to 7 nm, preferably 5.5 to 6.5 nm. In some embodiments, an average pore diameter of the second mode of the nanocomposite, according to BJH measurement method, is in a range from 6 to 14 nm, preferably 8 to 12 nm, preferably 8.5 to 11 nm, preferably 9.0 to 10 nm. In some embodiments, an average pore diameter of the third mode of the nanocomposite, according to BJH measurement method, is in a range from 12 to 22 nm, preferably 14 to 20 nm, preferably 16 to 18 nm, preferably 16.5 to 17.5 nm. In a preferred embodiment, according to BJH measurement method, the nanocomposite has a trimodal pore size distribution with average pore diameters maximized at 6.2 nm, 9.53 nm, and 17.2 nm.

An average pore volume of the nanocomposite, according to the BJH measurement method, is greater than or equal to 0.075 cm$^3$/g, preferably greater than or equal to 0.10 cm$^3$/g, preferably greater than or equal to 0.125 cm$^3$/g. In a preferred embodiment, according to the BJH measurement method, the nanocomposite has a pore volume greater than or equal to 0.15 cm$^3$/g. In another preferred embodiment, according to the BJH measurement method, the nanocomposite has a pore volume greater than or equal to 0.20 cm$^3$/g. In yet another preferred embodiment, according to the BJH measurement method, the nanocomposite has a pore volume greater than or equal to 0.25 cm$^3$/g.

In some embodiments, an average pore distribution of the nanocomposite may include, but is not limited to, crystalline average pore distribution, bimodal, trimodal, multimodal, narrow, broad and Gaussian. In a preferred embodiment, the average pore distribution of the nanocomposite is trimodal. This trimodal pore structure suggests that the nanocomposite contains differently sized populations of pores, which may contribute to enhanced properties such as improved surface area, increased mechanical strength, or enhanced porosity for specific applications.

TEM is primarily known for its ability to reveal fine structural details at atomic and molecular levels, it may also provide information about the size, shape, distribution, and morphology of pores in porous materials. TEM may reveal the fine details of pore structures, especially in materials with pores in the nanometer range (e.g., mesoporous materials). By imaging thin sections of the material, it may provide high-resolution images that help identify the size, shape, and arrangement of the pores. In some embodiments, TEM images of the nanocomposite showed a two-dimensional porous structure constructed with curled and wrinkled nanosheets of g-C$_3$N$_4$ with metal oxide nanoparticles dispersed on the surface of g-C$_3$N$_4$.

In some embodiments, the nanocomposite may exist in various morphological shapes such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, and their mixtures. In a preferred embodiment, the nanocomposite has a morphology including spherical metal oxide nanoparticles dispersed on g-C$_3$N$_4$ nanosheets.

In some embodiments, the spherical metal oxides nanoparticles have an average particle diameter in a range from 1 to 21 nm, preferably 3 to 18 nm, preferably 5 to 12 nm, preferably 7 to 10 nm. In a preferred embodiment, the spherical metal oxides nanoparticles have an average particle diameter of 8.5 nm.

In some embodiments, the nanocomposite material is crystalline and includes a zirconium oxide (ZrO$_2$) phase, a calcium silicate (CaSiO$_3$) phase, and graphitic carbon nitride (g-C$_3$N$_4$). ZrO$_2$ may exist in various crystalline phases, such as monoclinic, tetragonal, and cubic, although in a preferred embodiment, the dominant phase is a monoclinic phase.

In one or more embodiments, the ZrO$_2$/CaSiO$_3$/g-C$_3$N$_4$ nanocomposite material has a ZrO$_2$ content in a range from 28 to 38 weight % (wt. %), a CaSiO$_3$ content in a range from 28 to 38 wt. %, and a g-C$_3$N$_4$ content in a range from 28 to 38 wt. %.

According to a second aspect of the present disclosure, a method of making the ZrO$_2$/CaSiO$_3$/g-C$_3$N$_4$ nanocomposite material is described (FIG. 1). The order in which the method 50 is described is not intended to be construed as a limitation, and any number of the described method steps may be combined to implement the method 50. Additionally, individual steps may be removed or skipped from the method 50 without departing from the spirit and scope of the present disclosure.

At step 52, the method 50 includes autoclaving a solution including calcium nitrate, sodium metasilicate, and ethanol at a temperature from 120 to 240° C., preferably 150 to 210° C. for 0.5 to 5 hours, preferably 1 to 3 hours to form a first reaction mixture.

In some embodiments, the concentration of calcium nitrate in the first reaction mixture is in a range from 0.1 to 10 g/L.

In some embodiments, the concentration of sodium metasilicate in the first reaction mixture is in a range from 0.1 to 10 g/L.

In some embodiments, the concentration of ethanol in the first reaction mixture is in a range from 300 to 700 mL/L, preferably 400 to 600 mL/L, still more preferably, 450 to 550 mL/L. In a preferred embodiment, the concentration of ethanol in the first reaction mixture is 500 ml/L.

In some embodiments, ethanol, isopropanol, or butanol may be used in the first reaction mixture, depending on the specific requirements of the reaction. Additionally, acetone or tetrahydrofuran (THF) may be considered if the reaction requires a stronger solvent with different polarity characteristics. The choice of alternative solvent depends on factors like solubility, reactivity, toxicity, and the reaction conditions. In a preferred embodiment, the solvent used in the first reaction mixture is ethanol.

At step 54, the method 50 includes dispersing the first reaction mixture in distilled water, filtering, and rinsing with distilled water to form calcium silicate (CaSiO$_3$). This step is done to remove any unreacted chemicals, by-products, or impurities from the first reaction mixture. In some embodiments, dispersing, filtering and rinsing of the first reaction mixture may be performed in ethanol or water, preferably deionized water or distilled water.

At step 56, the method 50 includes drying the CaSiO$_3$ at 100 to 140° C. for 1 to 2 hours to form dried CaSiO$_3$. Drying the CaSiO$_3$ at 100 to 140° C. for 1 to 2 hours is done to remove any residual moisture or solvents (such as water or ethanol) left from the previous washing and rinsing steps. Drying is typically performed by placing the material in an oven set to a specific temperature, usually between 100 to 140° C., where it is heated for a designated period to evaporate any residual moisture or solvents. In some cases, vacuum drying may be used to lower the pressure and enable evaporation at lower temperatures.

In some embodiments, drying may be performed 80 to 160° C. for 0.5 to 3.5 hours, preferably 90 to 150° C. for 0.5 to 3.5 hours. In a preferred embodiment, drying the CaSiO$_3$ may be at 100 to 140° C. for 1 to 2 hours to form dried CaSiO$_3$.

At step 58, the method 50 includes heating urea in a crucible at a temperature from 500 to 700° C. for 0.5 to 2 hours to form g-C$_3$N$_4$. Heating urea in a crucible at 500 to 700° C. is done to decompose urea and promote the polymerization of carbon and nitrogen, forming g-C$_3$N$_4$. The crucible provides a controlled environment for uniform heating, providing efficient decomposition and the formation of the desired nitrogen-rich carbon structure which provides for photocatalytic and electrochemical applications.

In some embodiments, the urea is heated in a crucible takes place at a temperature from 300 to 500° C. for 0.5 to 3.5 hours, preferably 350 to 450° C. for 0.5 to 3.5 hours, still more preferably, at 380 to 500° C. for 0.5 to 3.5 hours. In a preferred embodiment, the urea is heated in a crucible at a temperature from 500 to 700° C. for 0.5 to 2 hours.

At step 60, the method 50 includes heating a reactive solution including zirconium oxychloride octahydrate, xylose, and nitric acid at 160 to 240° C., preferably 180 to 220° C. for 2 to 4 hours to form a zirconium intermediate. Zirconium oxychloride octahydrate, xylose, and nitric acid are heated at 180 to 220° C. for 2 to 4 hours, causing zirconium oxychloride decomposition, with xylose as a source of carbon.

In some embodiments, the concentration of zirconium oxychloride octahydrate in the reactive solution mixture is in a range from 70 to 110 g/L, preferably 80 to 100 g/L, preferably 85 to 95 g/L. In a preferred embodiment, the concentration of zirconium oxychloride octahydrate in the reactive solution mixture is 90.9 g/L.

In some embodiments, the concentration of xylose in the reactive solution mixture is in a range from 70 to 110 g/L, preferably 80 to 100 g/L, preferably 85 to 95 g/L. In a preferred embodiment, the concentration of xylose in the reactive solution mixture is 90.9 g/L.

In some embodiments, the concentration of nitric acid in the reactive solution mixture is in a range from 70 to 110 ml/L, preferably 80 to 100 ml/L, still more preferably 85 to 95 ml/L. In a preferred embodiment, the concentration of nitric acid in the reactive solution mixture is 90.9 ml/L.

In some embodiments, other acids including sulfuric acid, hydrochloric acid and phosphoric acid may be used in place of nitric acid. In a preferred embodiment, the acid used in the reaction to form zirconium intermediate is nitric acid.

In some embodiments, other carbon sources including glucose, fructose, sucrose, and citric acid may be used. In a preferred embodiment, the carbon source used in the reaction to form zirconium intermediate is xylose.

At step 62, the method 50 includes calcining the zirconium intermediate at a 400 to 700° C., preferably 500 to 600° C. for 1 to 7, preferably 3 to 5 hours to form $ZrO_2$. At step 64, the dried $CaSiO_3$, $g-C_3N_4$, and $ZrO_2$ are dispersed in ethylene glycol monomethyl ether to form a second reaction mixture. In this dispersion process, the solids (Ca-$SiO_3$, $g-C_3N_4$, and $ZrO_2$) are evenly distributed or suspended in the liquid solvent (ethylene glycol monomethyl ether). This promotes interactions and homogeneous mixing between the components, which is often beneficial for subsequent reactions or for achieving the desired properties in the final composite material.

At step 66, the method 50 includes microwaving the second reaction mixture at 160 to 200° C. and 4 to 6 bar pressure for 0.5 to 2 hours to form a first intermediate. Microwaving accelerates the reaction by providing rapid, uniform heating, promoting the formation of the first intermediate efficiently. In some embodiments, the second reaction mixture is microwaved at 130 to 250° C. and 1 to 8 bar pressure for 0.5 to 4 hours to form a first intermediate, preferably 140 to 240° C. and 1 to 8 bar pressure for 0.5 to 4 hours, still more preferably, at 150 to 230° C. and 1 to 8 bar pressure for 0.5 to 4 hours. In a preferred embodiment, the second reaction mixture is microwaved at 160 to 200° C. and 4 to 6 bar pressure for 0.5 to 2 hours to form a first intermediate.

At step 68, the method 50 includes dispersing the first intermediate in distilled water, filtering, rinsing with distilled water, and drying at 80 to 220° C., preferably 120 to 180° C. for 1 to 7 hours, preferably 3 to 5 hours to form the $ZrO_2/CaSiO_3/g-C_3N_4$ nanocomposite material. Dispersing the first intermediate in distilled water helps to separate and evenly distribute the particles, removing any residual impurities in the $ZrO_2/CaSiO_3/g-C_3N_4$ nanocomposite material.

The following examples are provided solely for illustration and are not to be construed as limitations of the present disclosure, as many variations thereof are possible without departing from the spirit and scope of the present disclosure.

EXAMPLES

The following examples demonstrate a $ZrO_2/CaSiO_3/g-C_3N_4$ nanocomposite material. The examples are provided solely for illustration and are not to be construed as limitations of the present disclosure, as many variations thereof are possible without departing from the spirit and scope of the present disclosure.

Example 1: Fabricating the $CaSiO_3$

Equal moles of calcium nitrate (0.5 g) and sodium metasilicate (0.37 g) were dispersed in 100 milliliters (mL) of ethanol: water (1:1) in a 150 mL glass beaker and sonicated for 15 minutes. The mixture was transferred to a 200 mL autoclave and then placed in an oven operated at 180° C. for 2 hours. The product was dispersed in 500 ml distilled water with an ultrasonic bath for 10 minutes, filtered via a Buchner system, rinsed with distilled water, and dried at 120° C. for 1 hour.

Example 2: Fabricating the $g-C_3N_4$

About 30 grams (g) of urea was placed in a 250 mL porcelain crucible, covered with its porcelain cover, then the crucible and cover were wrapped with three layers of aluminum foil to reduce the urea loss to sublimation. The crucible was heated via a furnace set at 600° C. for 45 minutes.

Example 3: Fabricating the $ZrO_2$

About 10 g zirconium oxychloride octahydrate and 10 g of xylose were placed in a 500 mL beaker. 100 ml distilled water was added to the mixture and heated till a clear solution was obtained. 10 mL of concentrated nitric acid was added to the mixture, which was then at 200° C. heated until the carbonization of xylose. The mixture was placed in an oven set at 200° C. for 3 hours, the black product was milled in a mortar, placed in a 150 mL porcelain dish, and calcined at 550° C. for 4 hours.

Example 4: Fabricating the $ZrO_2/CaSiO_3@g-C_3N_4$

An equal amount of $CaSiO_3$, $g-C_3N_4$, and $ZrO_2$ (0.5 grams each) was transferred to a mono wave-200 vial (G30), dispersed in 20 mL ethylene glycol monomethyl ether via an ultrasonic bath for 30 minutes. The vial was closed with its Teflon cover and placed in the Anton-Baar Monowave-200 operated at 180° C. and 5 bar pressure for one hour. The product was dispersed in 1 litre (L) distilled water with an ultrasonic bath for 30 minutes, filtered via a Buchner system, rinsed with distilled water, and dried at 150° C. for 2 hours.

Figure 2:
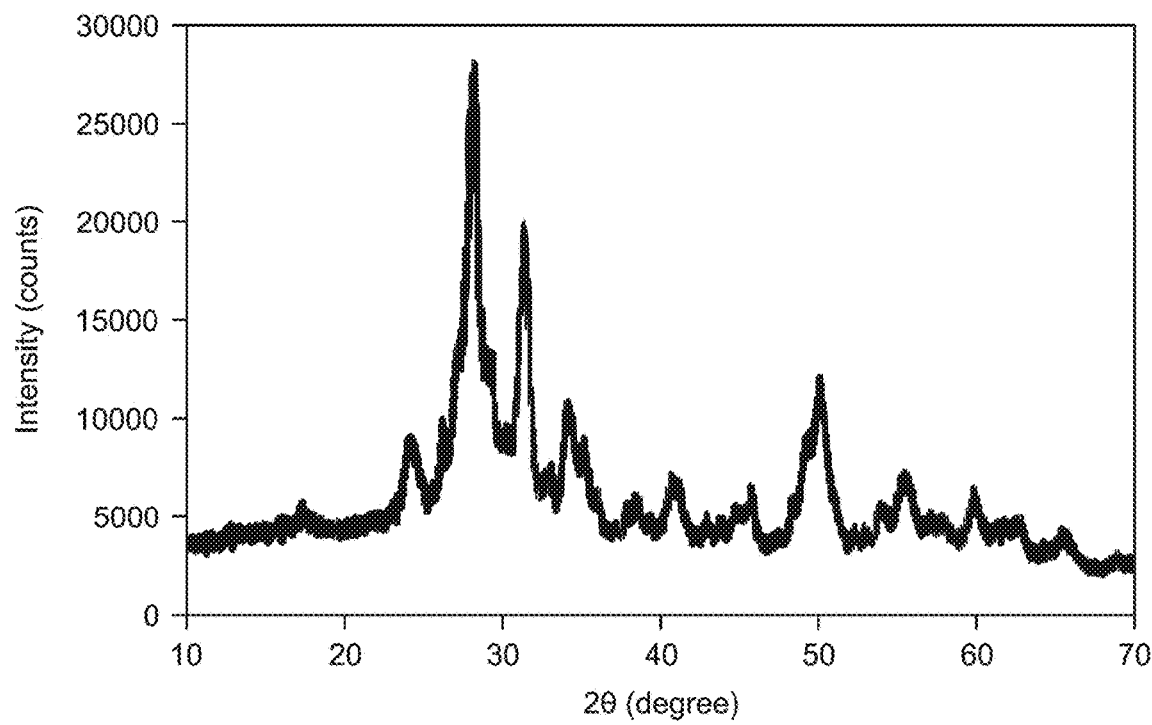
FIG. 2 shows an X-ray diffraction (XRD) diffractogram of the nanocomposite material, according to certain embodiments.

X-ray diffraction (XRD) was used to examine the crystallinity and phase identification of the $ZrO_2/CaSiO_3/g$-$C_3N_4$ catalyst, and the findings are shown in FIG. 2. The powder's high crystalline nature is shown by its sharp peaks and high-intensity values. $ZrO_2$ is present as a primary phase, and $CaSiO_3$ and $g$-$C_3N_4$ are minor phases, according to an analysis of the diffraction patterns using standard PDF cards. The 2θ values of 23.9°, 28.0°, 31.3°, 33.9°, and 49.9° were indexed to (011), (11), (111), (002), and (220) planes of the $ZrO_2$ monoclinic phase, respectively (reference code No. 01-074-0815). The 2θ values of 20.4°, 26.8°, 28.9°, 30.2°, and 50.1° values were indexed to (21-1), (20-2), (202), (320), and (040) planes of $CaSiO_3$ phase, respectively (reference code 01-072-2297). The $g$-$C_3N_4$ diffractions were recorded at 28.5° and 47.5° (reference code No. 01-072-0497), indicating that $ZrO_2/CaSiO_3/g$-$C_3N_4$ was successfully fabricated since no further phases were found.

Figure 3A:
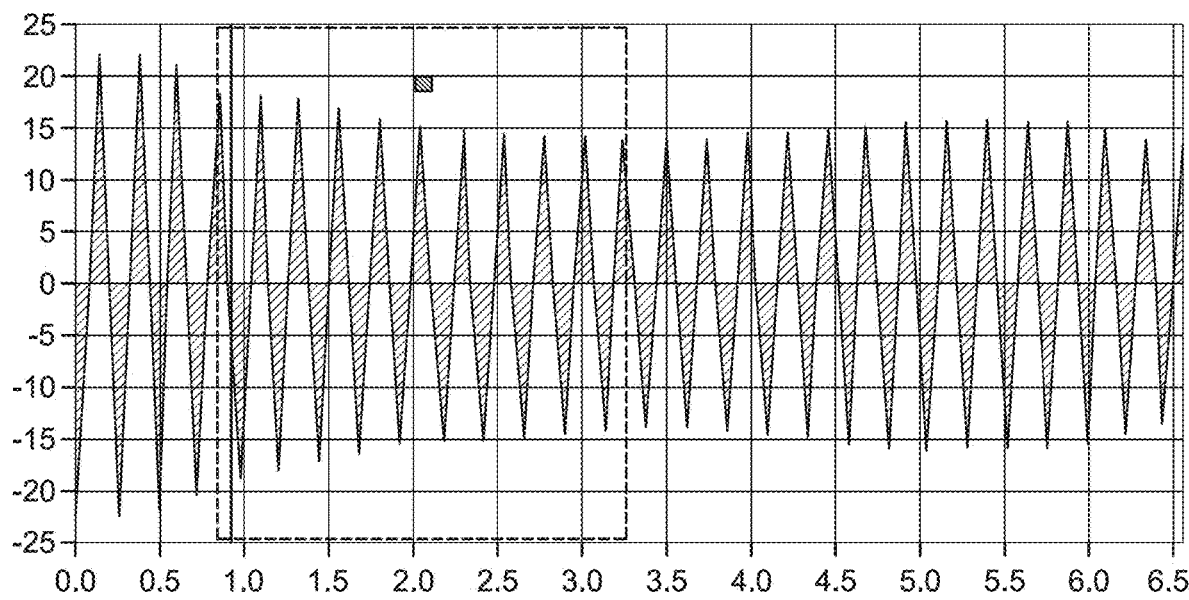
FIG. 3A shows an inverse fast Fourier transform (IFFT) measurements of HRTEM image of the nanocomposite material, according to certain embodiments.
Figure 3B:
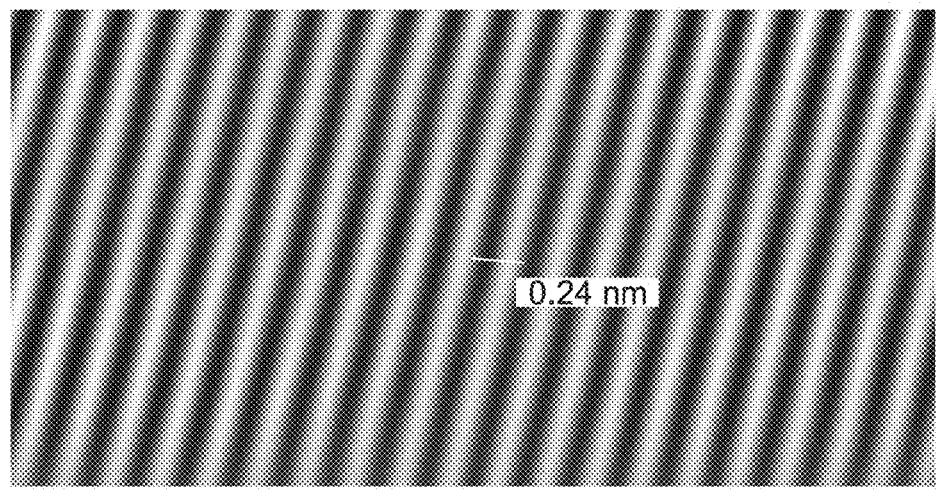
FIG. 3B shows a statistical line profile of IFFT for HRTEM image showing the d-spacing value, according to certain embodiments.
Figure 3C:
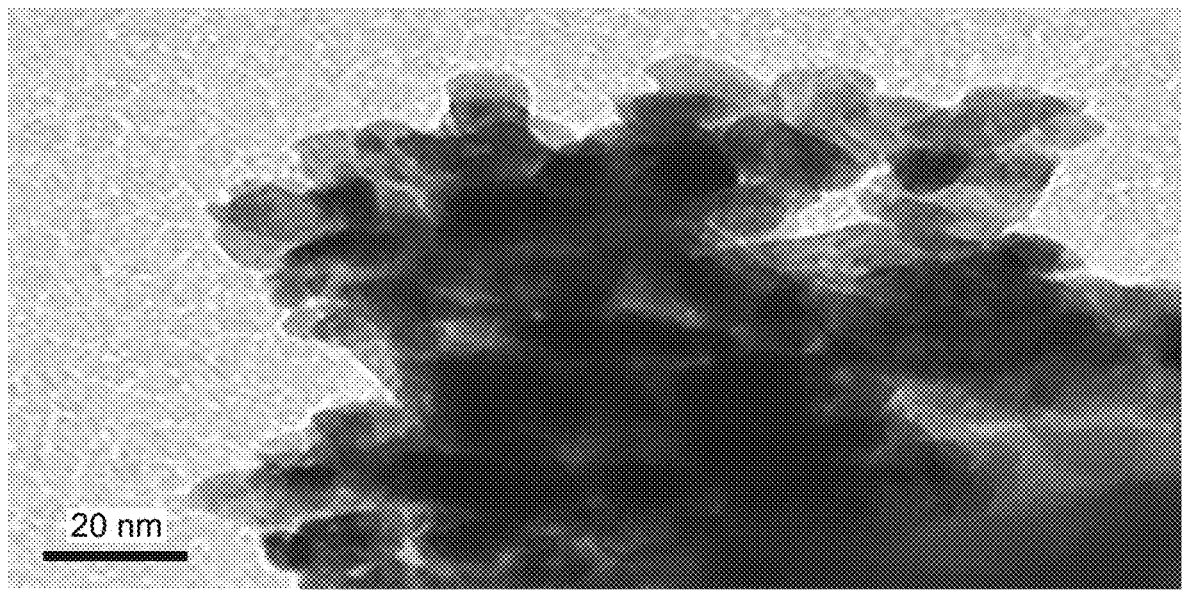
FIG. 3C shows a transmission electron microscopy (TEM) image of the nanocomposite material at 20 nm scale, according to certain embodiments.
Figure 3D:
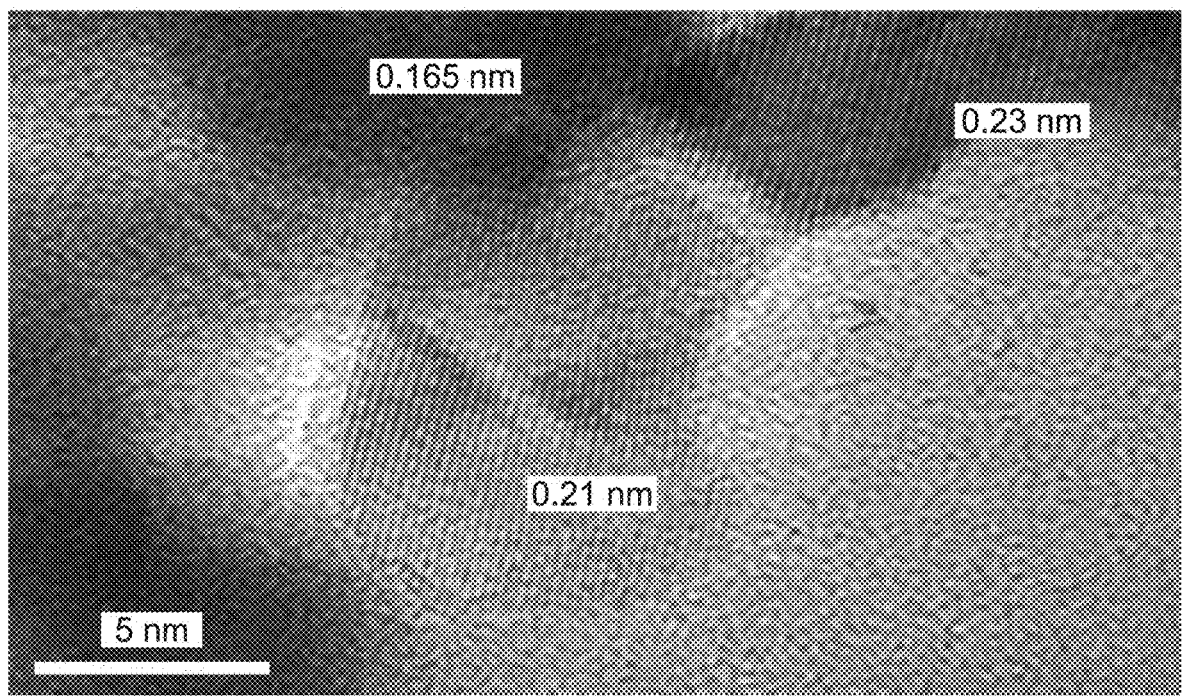
FIG. 3D shows a high-resolution transmission electron microscopy (HRTEM) of the nanocomposite material, according to certain embodiments.
Figure 3E:
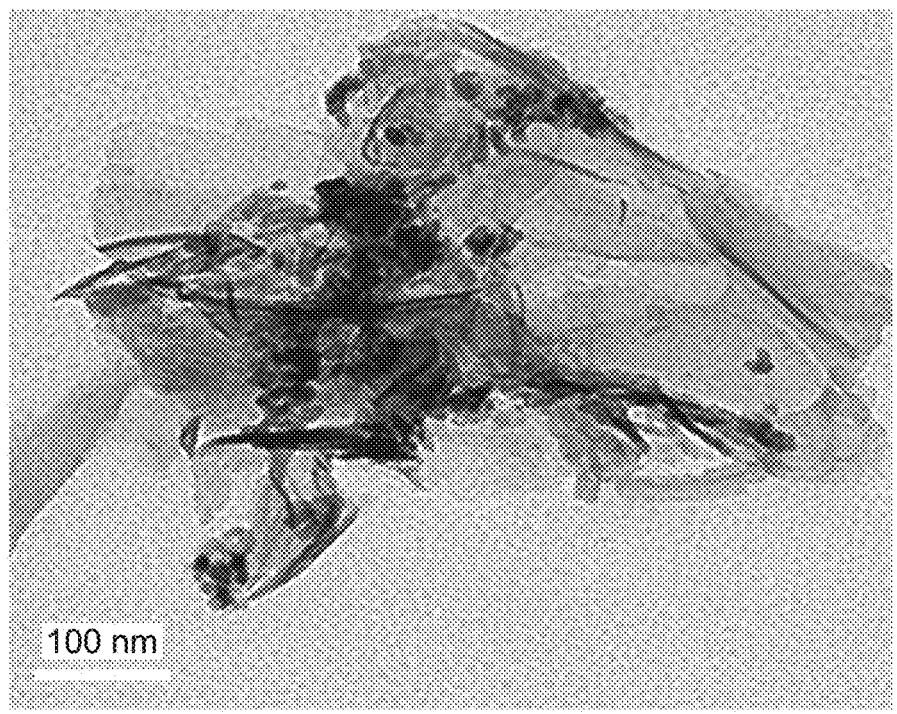
FIG. 3E shows the TEM image of the nanocomposite material at 100 nm scale, according to certain embodiments.
Figure 3F:
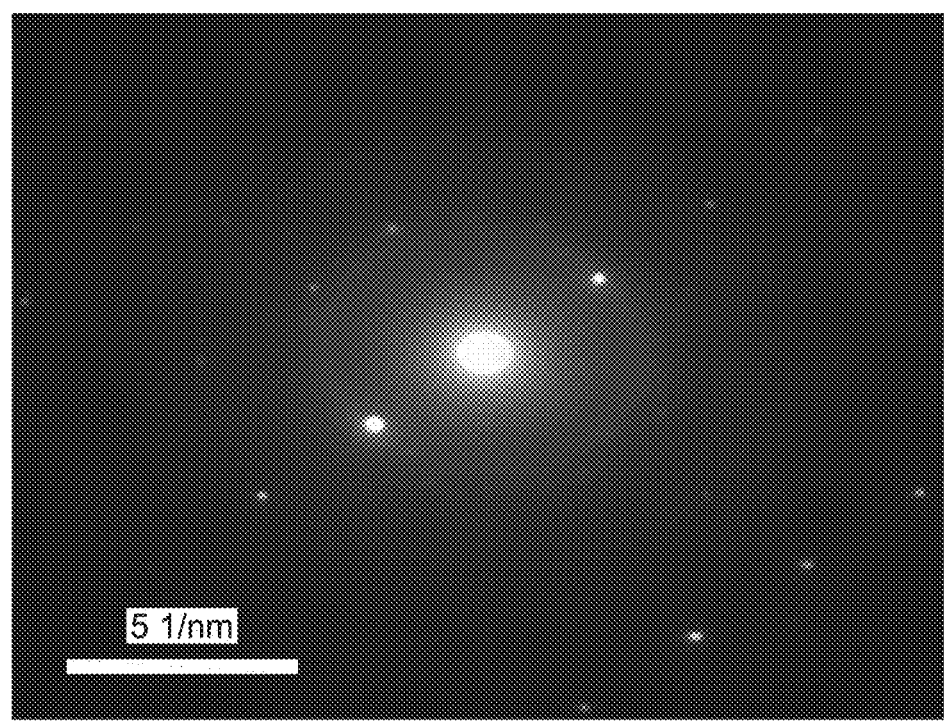
FIG. 3F shows a selected area electron diffraction (SAED) patterns of the nanocomposite material, according to certain embodiments.

Transmission electron microscopy (TEM) images of $ZrO_2/CaSiO_3@g$-$C_3N_4$ nanocomposite are presented in FIGS. 3C-3E. The TEM images show a two-dimensional porous structure constructed with curled and wrinkled nanosheets and platelets of the $g$-$C_3N_4$ and well-dispersed homogeneous spherical metal oxide nanoparticles with a size of 8.5 nm on the nanosheets of $g$-$C_3N_4$. The selected area electron diffraction (SAED) pattern of the $ZrO_2/CaSiO_3@g$-$C_3N_4$ nanocomposite is shown in FIG. 3F. The SAED pattern reveals diffraction spots with interplanar spacing of 0.31 nm, 0.154 nm, and 0.13 nm due to ($CaSiO_3$: 202, $ZrO_2$: −111), ($ZrO_2$: −302, $C_3N_4$: 331, $CaSiO_3$: 54-1) and ($CaSiO_3$: 33-4, $ZrO_2$: 123), diffraction planes. A high-resolution transmission electron microscopy (HRTEM) image of the $ZrO_2/CaSiO_3@g$-$C_3N_4$ nanocomposite is shown in FIG. 3D. The HRTEM image shows a plane spacing of 0.23 nm related to the (002) of carbon nitride (CN), where 0.165 nm and 0.21 nm are related respectively to the ($CaSiO_3$: 40-4, $ZrO_2$: −113) and ($CaSiO_3$: 512, $ZrO_2$: −112) planes are characterizing the heterostructure formation. The fast Fourier transform (FFT) and inverse fast Fourier transform (IFFT) measurements of HRTEM image show a d-spacing value of 0.24 nm given to $ZrO_2/CaSiO_3@g$-$C_3N_4$ nanocomposite, signifying the lattice spacing of ($C_3N_4$: 220), indicating the development of $g$-$C_3N_4$ structure. The FFT measurements of the HRTEM image are shown in FIG. 3A, and FIG. 3B shows the IFFT measurements for the HRTEM image showing the d-spacing value.

Figure 4A:
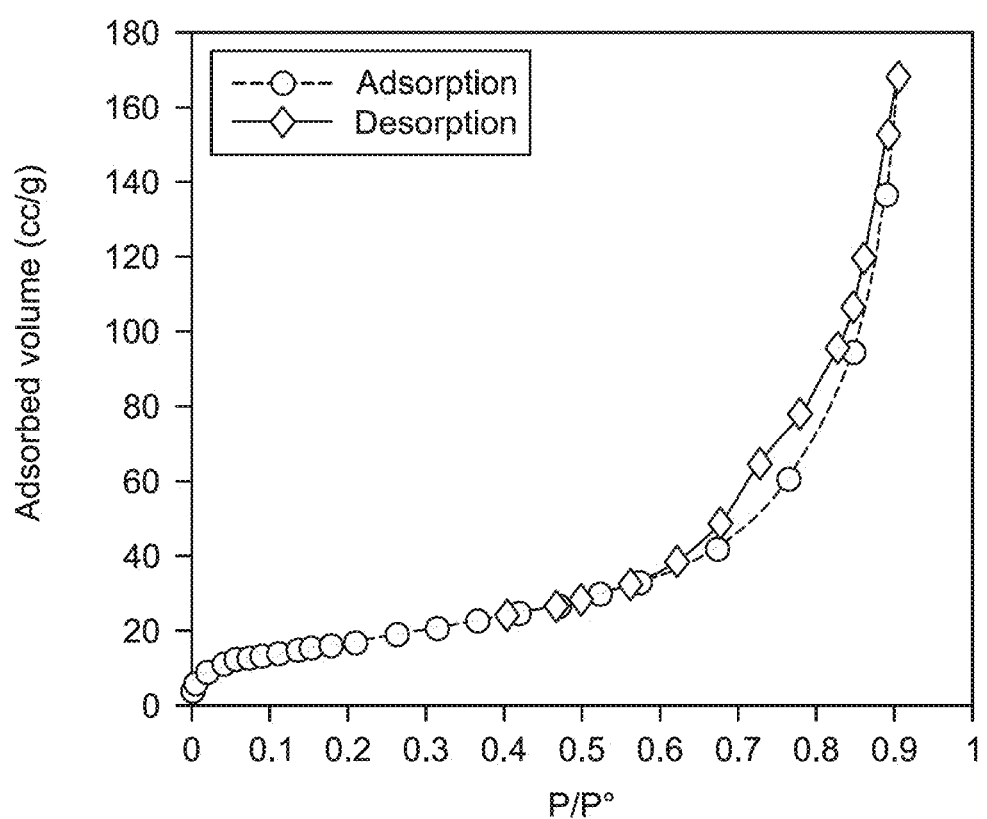
FIG. 4A shows $N_2$ adsorption-desorption isotherms of the nanocomposite material, according to certain embodiments.
Figure 4B:
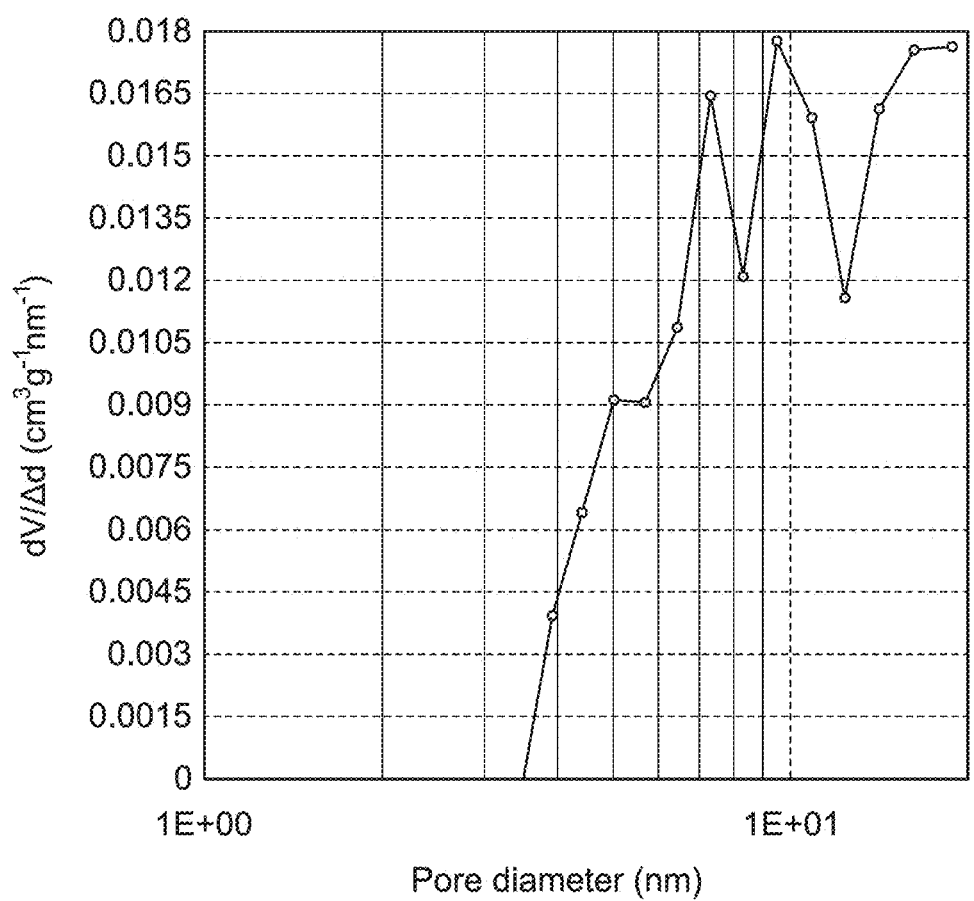
FIG. 4B shows the pore size distribution curves, plotted using the Barrett-Joyner-Halenda (BJH) method, according to certain embodiments.

FIG. 4A displays the nitrogen adsorption-desorption isotherms of the $ZrO_2/CaSiO_3@g$-$C_3N_4$ nanocomposite. The nitrogen sorption isotherm of the composite belongs to type IV with a narrow hysteresis loop, indicating the formation of mesoporous structures. However, shifting the loop to a relatively higher pressure (relative pressure (P/$P_0$)=0.58-1) suggests the presence of wide mesopores, which may result from the deposition of metal oxides particles in the wide pores of $g$-$C_3N_4$. Furthermore, the Brunauer-Emmett-Teller (BET) surface area of the $ZrO_2/CaSiO_3@g$-$C_3N_4$ sample was calculated to be 66.5 square meters per gram ($m^2$ $g^{-1}$). The marked high specific surface area reflects the good dispersion of the above-mentioned metal oxide nanoparticles on $g$-$C_3N_4$. Moreover, the pore size distribution curves, plotted using the Barrett-Joyner-Halenda (BJH) method (FIG. 4B), for the $ZrO_2/CaSiO_3@g$-$C_3N_4$ sample exhibited trimodal distribution with average pore diameters maximized at 6.2 nm, 9.53 nm, and 17.2 nm and pore volume of 0.26 cubic centimetres ($cm^3$ $g^{-1}$). All the isotherms belong to the category H3 hysteresis loop type of pores, which do not exhibit limiting adsorption at high P/$P_o$ and arise due to aggregation of plate-like particles giving rise to slit-shaped pores. The obtained results indicate that the assembly of the $ZrO_2/CaSiO_3@g$-$C_3N_4$ composite provoked a mesoporous array.

Numerous modifications and variations of the present disclosure are possible in light of the above teachings. It is therefore to be understood that within the scope of the appended claims, the disclosure may be practiced otherwise than as specifically described herein.

The invention claimed is:

1. A $ZrO_2/CaSiO_3/g$-$C_3N_4$ nanocomposite material, comprising:
   spherical metal oxide nanoparticles comprising a $ZrO_2$ phase and a $CaSiO_3$ phase dispersed on a matrix of $g$-$C_3N_4$ nanosheets,
   wherein the spherical metal oxide nanoparticles have an average particle diameter in a range from 3 to 18 nm, and
   wherein the $ZrO_2/CaSiO_3/g$-$C_3N_4$ nanocomposite material has a BET surface area greater than or equal to 55 $m^2 \cdot g^{-1}$.

2. The $ZrO_2/CaSiO_3/g$-$C_3N_4$ nanocomposite material of claim 1, wherein the $ZrO_2/CaSiO_3/g$-$C_3N_4$ nanocomposite material has a BET surface area greater than or equal to 60 $m^2 \cdot g^{-1}$.

3. The $ZrO_2/CaSiO_3/g$-$C_3N_4$ nanocomposite material of claim 2, wherein the $ZrO_2/CaSiO_3/g$-$C_3N_4$ nanocomposite material has a BET surface area greater than or equal to 65 $m^2 \cdot g^{-1}$.

4. The $ZrO_2/CaSiO_3/g$-$C_3N_4$ nanocomposite material of claim 1, wherein the $ZrO_2/CaSiO_3/g$-$C_3N_4$ nanocomposite material has a pore volume greater than or equal to 0.15 $cm^3 \cdot g^{-1}$.

5. The $ZrO_2/CaSiO_3/g$-$C_3N_4$ nanocomposite material of claim 4, wherein the $ZrO_2/CaSiO_3/g$-$C_3N_4$ nanocomposite material has a pore volume greater than or equal to 0.20 $cm^3 \cdot g^{-1}$.

6. The $ZrO_2/CaSiO_3/g$-$C_3N_4$ nanocomposite material of claim 5, wherein the $ZrO_2/CaSiO_3/g$-$C_3N_4$ nanocomposite material has a pore volume greater than or equal to 0.25 $cm^3 \cdot g^{-1}$.

7. The $ZrO_2/CaSiO_3/g$-$C_3N_4$ nanocomposite material of claim 1, wherein the $ZrO_2/CaSiO_3/g$-$C_3N_4$ nanocomposite material has a trimodal pore size distribution with average pore diameters maximized at 6.2, 9.53, and 17.2 nm.

8. The $ZrO_2/CaSiO_3/g$-$C_3N_4$ nanocomposite material of claim 1, wherein the spherical metal oxide nanoparticles have an average particle diameter in a range from 5 to 12 nm.

9. The $ZrO_2/CaSiO_3/g$-$C_3N_4$ nanocomposite material of claim 8, wherein the spherical metal oxide nanoparticles have an average particle diameter of 8.5 nm.

10. A method for making the $ZrO_2/CaSiO_3/g$-$C_3N_4$ nanocomposite material of claim 1, comprising:
   autoclaving a solution comprising calcium nitrate, sodium metasilicate, and ethanol at a temperature from 150 to 210° C. for 1 to 3 hours to form a first reaction mixture;
   dispersing the first reaction mixture in distilled water, filtering, and rinsing with distilled water to form $CaSiO_3$;
   drying the $CaSiO_3$; at 100 to 140° C. for 1 to 2 hours to form dried $CaSiO_3$;
   heating urea in a crucible at a temperature from 500 to 700° C. for 0.5 to 2 hours to form $g$-$C_3N_4$;

heating a reactive solution comprising zirconium oxychloride octahydrate, xylose, and nitric acid at 180 to 220° C. for 2 to 4 hours to form a zirconium intermediate;

calcining the zirconium intermediate at a 500 to 600° C. for 3 to 5 hours to form $ZrO_2$;

dispersing the dried $CaSiO_3$, g-$C_3N_4$, and $ZrO_2$ in ethylene glycol monomethyl ether to form a second reaction mixture;

microwaving the second reaction mixture at 160 to 200° C. and 4 to 6 bar pressure for 0.5 to 2 hours to form a first intermediate; and dispersing the first intermediate in distilled water, filtering, rinsing with distilled water, and drying at 120 to 180° C. for 3 to 5 hours to form the $ZrO_2$/$CaSiO_3$/g-$C_3N_4$ nanocomposite material.

11. The method of claim 10, wherein the concentration of calcium nitrate in the first reaction mixture is in a range from 0.1 to 10 g/L.

12. The method of claim 10, wherein the concentration of sodium metasilicate in the first reaction mixture is in a range from 0.1 to 10 g/L.

13. The method of claim 10, wherein the concentration of ethanol in the first reaction mixture is in a range from 400 to 600 ml/L.

14. The method of claim 10, wherein the urea is heated in the crucible at a temperature of 600° C. for 45 minutes.

15. The method of claim 10, wherein the concentration of zirconium oxychloride octahydrate in the reactive solution mixture is in a range from 80 to 100 g/L.

16. The method of claim 10, wherein the concentration of xylose in the reactive solution mixture is in a range from 80 to 100 g/L.

17. The method of claim 10, wherein the concentration of nitric acid in the reactive solution mixture is in a range from 80 to 100 ml/L.

18. The method of claim 10, wherein the zirconium intermediate is calcined at 550° C. for 4 hours to form $ZrO_2$.

19. The method of claim 10, wherein the second reaction mixture is microwaved at 180° C. and 5 bar pressure.

20. The method of claim 10, wherein the second reaction mixture is microwaved for 1 hour.

* * * * *